United States Patent
Haller

(10) Patent No.: US 7,644,995 B2
(45) Date of Patent: Jan. 12, 2010

(54) MOTOR SPEED CONTROL FOR THERMAL PROTECTION

(75) Inventor: Mark Haller, Canton, MI (US)

(73) Assignee: Kelsey-Hayes Company, Livonia, MI (US)

( * ) Notice: Subject to any disclaimer, the term of this patent is extended or adjusted under 35 U.S.C. 154(b) by 410 days.

(21) Appl. No.: 11/635,872

(22) Filed: Dec. 8, 2006

(65) Prior Publication Data

US 2008/0140293 A1 Jun. 12, 2008

(51) Int. Cl.
*B60T 13/20* (2006.01)
(52) U.S. Cl. ............ 303/11; 303/116.1; 303/115.4
(58) Field of Classification Search ............ 303/10, 303/11, 20, 113.1, 115.4, 116.4, 138, 156, 303/157, 158, 116.1; 701/70, 71, 78, 80, 701/82, 83
See application file for complete search history.

(56) References Cited

U.S. PATENT DOCUMENTS

| | | | |
|---|---|---|---|
| 4,893,067 A | 1/1990 | Bhagwat et al. | |
| 4,995,094 A | 2/1991 | Aio | |
| 5,003,628 A | 3/1991 | Houser et al. | |
| 5,184,299 A | 2/1993 | Hogan et al. | |
| 5,188,440 A * | 2/1993 | Muller et al. | 303/10 |
| 5,410,229 A | 4/1995 | Sebastian et al. | |
| 5,528,721 A | 6/1996 | Searcy, II et al. | |
| 5,967,253 A | 10/1999 | Collier-Hallman | |
| 6,095,620 A | 8/2000 | Dillard et al. | |
| 6,188,947 B1 | 2/2001 | Zhan | |
| 6,339,738 B1 * | 1/2002 | Kohl et al. | 701/70 |
| 6,762,577 B2 | 7/2004 | Gray et al. | |
| 7,303,241 B2 * | 12/2007 | Kokubo | 303/10 |
| 2002/0130549 A1 * | 9/2002 | Harris et al. | 303/11 |
| 2005/0069418 A1 * | 3/2005 | Kokubo | 417/44.1 |

* cited by examiner

*Primary Examiner*—Thomas J Williams
(74) *Attorney, Agent, or Firm*—MacMillan, Sobanski & Todd, LLC

(57) ABSTRACT

The speed of an ABS pump motor is increased during an ABS braking cycle upon determining that an extended ABS braking cycle duration is required.

12 Claims, 3 Drawing Sheets

MOTOR SPEED CONTROL FOR THERMAL PROTECTION

CROSS-REFERENCE TO RELATED APPLICATIONS

Not Applicable

BACKGROUND OF THE INVENTION

This invention relates in general to electronic brake control systems and in particular to anti-lock brake control systems.

An Anti-lock Brake System (ABS) is often included as standard equipment on new vehicles. When actuated, the ABS is operative to modulate the pressure applied to some or all of the vehicle wheel brakes. A typical ABS includes a plurality of solenoid valves mounted within a control valve body and connected to the vehicle hydraulic brake system. The valve body also includes an accumulator for the temporary storage of brake fluid during an anti-lock braking cycle.

A separate hydraulic source, such as a motor driven pump, is usually included in the ABS for reapplying hydraulic pressure to the controlled wheels during an ABS braking cycle. The pump is typically disposed within the control valve body with the pump motor mounted upon the exterior of the control valve body. The pump motor is usually a direct current brushed motor that operates from the vehicle power supply. Typically, the motor runs continuously during an ABS braking cycle. However, the motor speed is controlled by exciting the motor with a constant frequency Pulse Width Modulated (PWM) voltage that is generated by a semiconductor based motor drive circuit. The PWM duty cycle is reduced toward the end of an ABS brake cycle to slow the motor and thereby reduce motor noise.

An ABS further includes a microprocessor disposed within an Electronic Control Module (ECU) that is mounted upon the control valve body. The microprocessor is electrically connected to a semiconductor based pump motor drive circuit, which is also disposed within the ECU, a plurality of solenoid coils associated with the solenoid valves and wheel speed sensors for monitoring the speed and deceleration of the controlled wheels. The assembled control valve body, motor and control module form a compact unit which is often referred to as an ABS control valve.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to initiate an ABS braking cycle. During the ABS braking cycle, the microprocessor actuates the pump motor and selectively operates the solenoid valves in the control valve to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the vehicle operator.

The microprocessor includes a memory portion which stores an ABS control algorithm. The ABS control algorithm comprises a set of instructions for the microprocessor which control the operation of the ABS. Typically, the instructions include a set of operational checks which are run during vehicle start up to assure that the ABS is functional. The control algorithm also includes subroutines for monitoring the vehicle operation to detect a potential lock-up of the controlled wheel brakes and for the actual operation of the ABS during an anti-lock braking cycle. The control algorithm may also include subroutines that selectively operate the solenoid valves and pump to provide Traction Control (TC) and Vehicle Stability Control (VSC) to the vehicle.

As described above, the ABS includes a semiconductor based motor drive circuit. The motor drive circuit is designed to operate under a worse case scenario. Accordingly, during an extended ABS braking cycle, such as may be encountered when a vehicle is stopped upon a very low mu surface, the extended operation of the motor may cause excessive heating of the motor drive circuit. Additionally, because the motor drive circuit is disposed within the ECU, the other components contained therein also are exposed to the heat generated by the motor drive circuit. Therefore, it would be desirable to reduce the heat generated by motor drive circuit during an extended ABS braking cycle.

BRIEF SUMMARY OF THE INVENTION

This invention relates to a method for adjusting the speed of a pump motor in an anti-lock brake control system.

The present invention, contemplates reducing the heat generated by an ABS motor drive circuit during extended ABS braking cycles by increasing the motor speed at the end of an extended braking cycle. Accordingly, the present invention contemplates determining that an extended operating time will be required for the pump motor for an ABS braking cycle and then increasing the speed of the pump motor during the ABS braking cycle Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
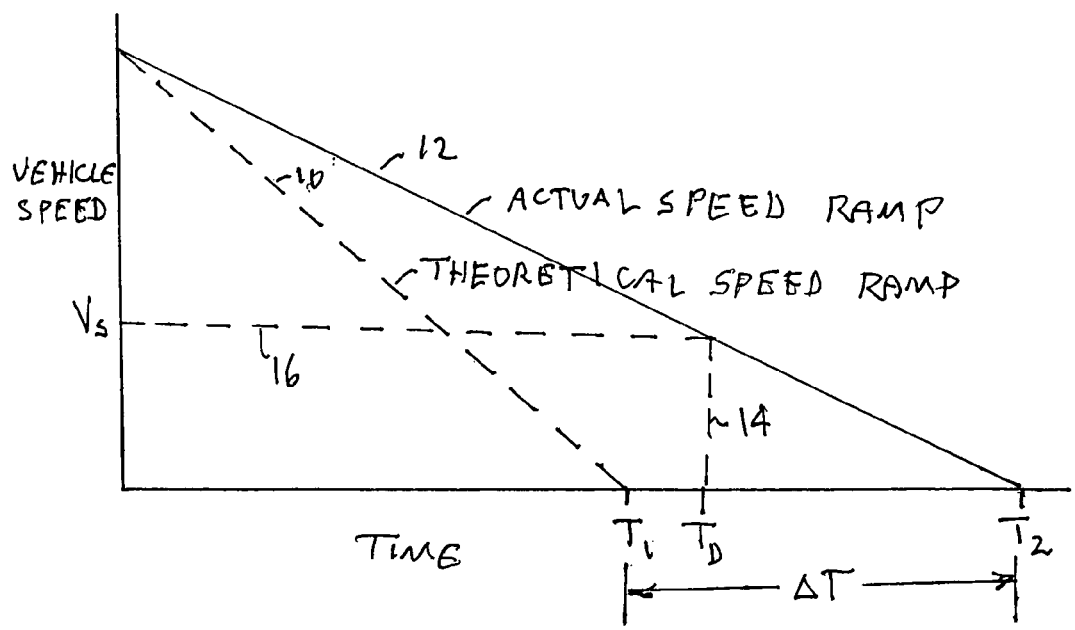
FIG. 1 is a graph illustrating theoretical and actual vehicle speed ramps utilized with present invention.

Referring now to the drawings, there is shown in FIG. 1 a graph that illustrates typical vehicle speeds vs. time during an ABS braking application. During such an application, the ABS ECU calculates a theoretical speed ramp, represented by the dashed line labeled 10 in FIG. 1. The theoretical speed ramp 10 represents the speed of the vehicle that is decelerated at a predetermined maximum rate, such as, for example, 0.1 g. Also shown in FIG. 1 is an extrapolated actual speed ramp that is labeled 12 in the figure. The actual speed ramp 12 is determined from actual vehicle speed at the beginning of the ABS braking application, with the actual vehicle speed being calculated from actual wheel speeds detected by the ABS wheel speed sensors.

When the vehicle is operating upon a low mu surface, the slope of the actual speed ramp 12 may well be less than the slope of the theoretical speed ramp 10, as shown in FIG. 1. Extending the theoretical speed ramp 10 to the horizontal axis on the graph shows that, in theory, the vehicle may be expected to stop at a first, or theoretical, stop time, $T_1$, while extending the actual speed ramp 12 to the horizontal axis shows that the vehicle may be expected to actually stop at a second, or actual, stop time, $T_2$.

The present invention contemplates increasing the pump motor speed to reduce heating of the control circuit components in the ECU when the difference between the theoretical and actual stop times, $T_1$ and $T_2$, which is shown in FIG. 1 as $\Delta T$, exceeds a predetermined time threshold, $T_T$. Additionally, in the preferred embodiment, the increase in motor speed is delayed until $T_D$, which occurs after $T_1$, in order to minimize any Noise Vibration and Harshness (NVH) due to increased motor speed. By delaying the motor speed increase until after $T_1$, operation upon normal road surfaces, as represented by the theoretical speed ramp 10, will result in the vehicle being stopped before the motor speed is increased. In the preferred embodiment, the vehicle speed may be increased when the duration of the ABS braking cycle exceeds a total time period equal to the delayed time $T_D$. Alternately, the microprocessor in the ECU uses the delayed time $T_D$ to calculate a corresponding vehicle speed threshold $V_S$, as illustrated by the dashed lines labeled 14 and 16 in FIG. 1. The vehicle speed threshold $V_S$ is compared to the actual vehicle speed, and, upon the actual vehicle speed reaching or falling below the threshold $V_S$, the motor speed is increased.

Figure 2:
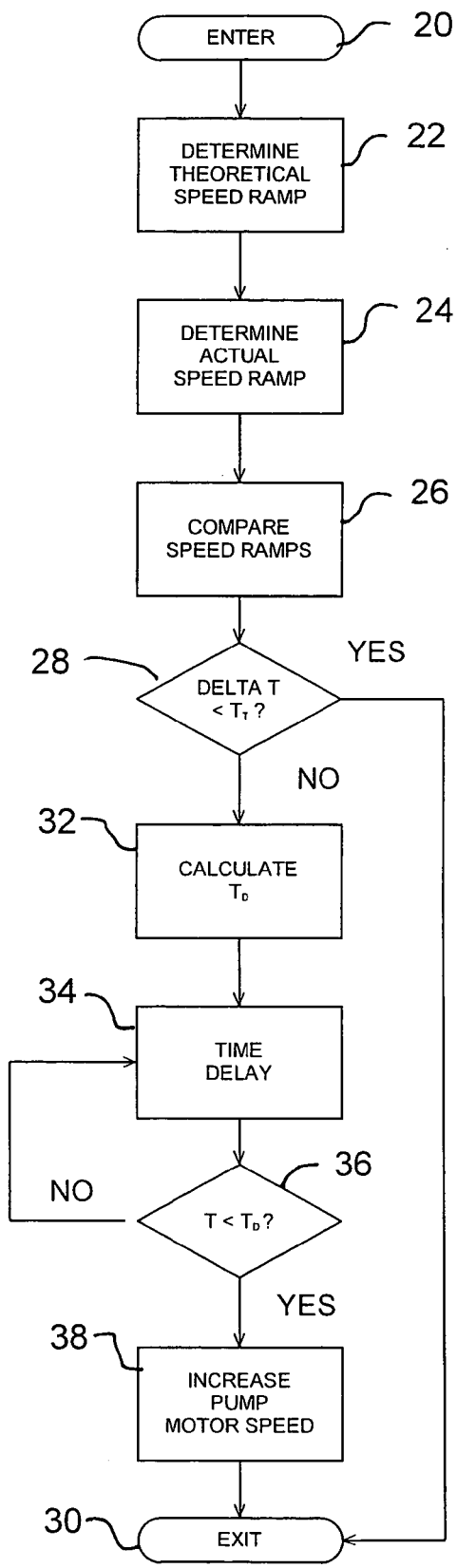
FIG. 2 is a flow chart of an algorithm for implementing the present invention.

The present invention is implemented by an algorithm that is illustrated by the flow chart shown in FIG. 2. The algorithm is entered at block 20 upon the occurrence of a triggering event, such as, for example, the initiation of an ABS braking cycle. The algorithm proceeds to functional block 22 where the theoretical speed ramp 10 that is shown in FIG. 1 is calculated. In the preferred embodiment, the theoretical speed ramp is calculated from the vehicle speed at the start of the ABS braking cycle and a predetermined maximum deceleration rate; however, other methods also may be utilized to calculate the theoretical speed ramp. Next, the actual speed ramp 12 that is also shown in FIG. 1 is calculated in functional block 24. In the preferred embodiment, the actual speed ramp is extrapolated from two or more successive wheel speed sensor readings; however, other methods also may be utilized to calculate the theoretical speed ramp. The algorithm then advances to decision functional block 26. In the preferred embodiment, the theoretical and actual speed ramps 10 and 12 are compared. In the preferred embodiment, the speed ramps are extrapolated to determine values for the horizontal intercepts $T_1$ and $T_2$, or stop times, for each of the ramps and the difference of the intercepts, $\Delta T$, is calculated. While the difference in the horizontal intercepts is utilized in the preferred embodiment, it will appreciated that the invention also may be practiced with a different methodology for comparing the speed ramps, such as, for example, determining and comparing the slopes of the two speed ramps 10 and 12 (not shown). The algorithm then continues to decision block 28.

In decision block 28, the difference in the stop times $\Delta T$ is compared to a threshold $T_T$, which may be either a predetermined value or a function of the actual vehicle speed when the ABS braking cycle is initiated. If the difference in the stop times $\Delta T$ is less than the threshold $T_T$, the total stopping time in deemed non-excessive and the algorithm exits through block 30. If, however, the difference in the stop times $\Delta T$ is greater than or equal to the threshold $T_T$ in decision block 28, the total stopping time in deemed excessive and the algorithm transfers to functional block 32 where the delayed time $T_D$ is calculated. The invention contemplates that the delayed time $T_D$ may be calculated as a function of the vehicle speed or as a function of another vehicle operating parameter. Alternately, a predetermined value for the delayed time $T_D$ may be utilized in place of a calculation. The algorithm then advances to functional block 34 which represents an iteration time delay. Once the time delay passes, the algorithm continues to decision block 36.

In decision block 36, the total elapsed time for the ABS braking cycle is compared to the delayed time $T_D$. If the total elapsed time is less than $T_D$, the algorithm transfers back to functional block 34 for another iteration time delay. If, in decision block 36, the total elapsed time is equal to or greater than $T_D$, it is time to increase the motor speed and the algorithm transfers to functional block 38. In functional block 38, a signal is generated or a flag set for increasing the pump motor speed to reduce the heat generated by the electronic components disposed within the ABS ECU. The algorithm then exits through block 30. As described above, in the preferred embodiment, the motor speed is increased when the duration of the ABS braking cycle exceeds the delayed time $T_D$ that occurs after the theoretical stop time $T_1$. However, by setting $T_D$ equal the theoretical stop time $T_1$, to motor speed also may be increased upon reaching the theoretical stop time.

Figure 3A:
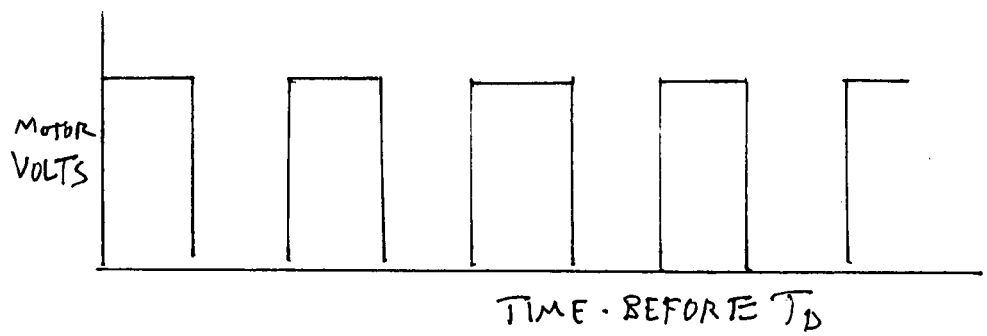
FIG. 3 illustrates the Pulse Modulated Voltages that are controlled by the algorithm represented by the flow chart shown in FIG. 2.
Figure 3B:
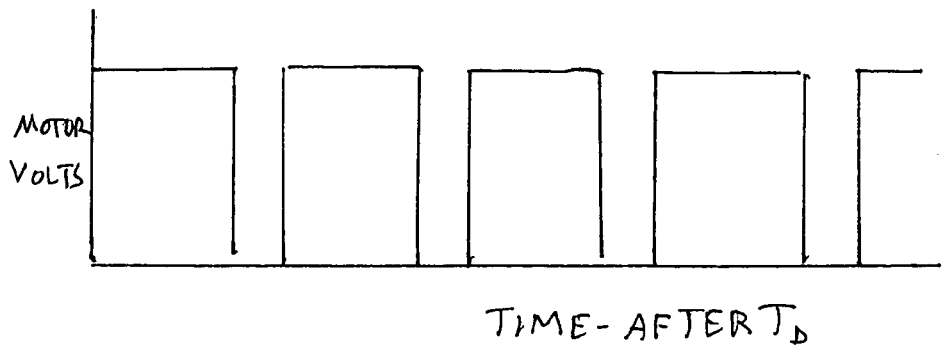

Returning to functional block 38 in FIG. 2, the pump motor speed is typically controlled by increasing the duty cycle of a constant frequency PWM voltage that excites the pump motor, as illustrated in FIG. 3. In FIG. 3A, a PWM voltage is shown that has a 50 percent duty cycle that represents the motor excitation voltage that exists before the motor speed is increased. In FIG. 3B, the duty cycle has been increased to 75 percent and represents the motor excitation voltage that exists after the motor speed is increased. The increased duty cycle results in an increased average current being supplied to the motor, which, in turn, causes the motor speed to increase. It will be appreciated that the duty cycles shown in FIG. 3 are representative and that the invention may be practiced with other duty cycles than those that are shown. The present invention also may be practiced with a motor control having an excitation voltage with a fixed duty cycle and variable frequency (not shown). For such a case, the frequency of the excitation voltage is raised to increase the motor speed upon reaching the time $T_D$. Additionally, the excitation voltage may utilize both duty cycle and frequency change to control motor speed (not shown), in which case one or both of the duty cycle and frequency would be changed upon reaching the time $T_D$.

Figure 4:
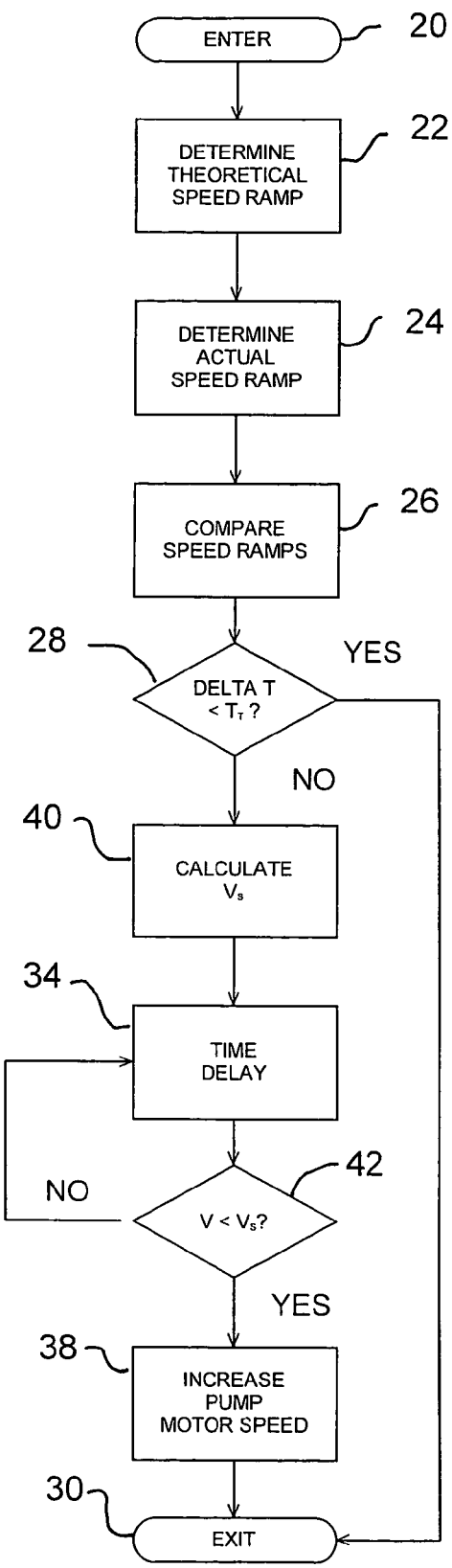
FIG. 4 is an alternate embodiment of the algorithm illustrated by the flow chart shown in FIG. 2.

As described above, the vehicle speed also may be utilized to determine if the motor speed is to be increased. An alternate embodiment of the algorithm is shown in FIG. 4 where blocks that are the same as shown in FIG. 2 have the same numerical identifiers. The alternate embodiment of the algorithm proceeds as described above to decision block 28 where the difference in the stop times $\Delta T$ is compared to the threshold $T_T$. Upon determining that the stop time difference $\Delta T$ is equal to or greater than the threshold $T_T$, the algorithm transfers to functional block 40 where the vehicle speed threshold $V_S$ is calculated. In the preferred embodiment, the vehicle speed threshold $V_S$ is calculated by first determining the delayed time $T_D$, as described above, and then using $T_D$ and the actual speed ramp 12, as illustrated by the dashed lines 14 and 16 in FIG. 1, to determine $V_S$. However, other methods may be utilized to calculate the vehicle speed threshold $V_S$. Following the iteration time delay in functional block 34, the algorithm proceeds to decision block 42 where the current vehicle speed is compared to the vehicle speed threshold $V_S$. If the current vehicle speed is less than the vehicle speed threshold $V_S$, the algorithm transfers back to functional block 34 for another iteration delay. If, however, in decision block 42, the current vehicle speed is equal to or greater than the vehicle speed threshold $V_S$, the algorithm transfers to functional block 38 and the pump motor speed is increased. The algorithm then continues as described above.

This invention provides a very simple algorithmic solution to this by providing a means to limit the load on the semiconductor device during only the extended duty cycle portions of the use of the product where the only penalty is increased NVH. Novelty is embodied not in the use of PWM but in modifying the target speed command based on duty cycle rather than load. For example on a long ABS stop on ICE where the noise vibration and harshness (NVH) management usually leads to driving the motor at a low speed this produces significant heat in the semiconductor device being used to PWM the motor. Based on this heating characteristic it is possible to either run the motor faster or even at full speed towards the end of such a 'long stop' to ease the load on the semiconductor device.

While the preferred embodiment of the invention has been illustrated and described in terms of an ABS, the invention also may be applied wherever Pulse Width Modulation or another control method is used to control the speed of a brushed electric motor driving a hydraulic pumping mechanism, as, for example, in electronic stability and traction control products. Also, it will be appreciated that the flow charts shown in FIGS. 2 and 4 are intended to be exemplary and that the invention also may be practiced with algorithms having flow charts that differ from the ones shown in the figures.

Applying the invention will provide for the majority of 'events' with the same good Noise Vibration Harshness (NVH) characteristics in all but the more severe cases of, for example, an very long event. The invention also can be used in lower cost systems where for short events only will lower speed motor control be provided, i.e. short bursts of low speed control only are allowed. For low speed control it may become necessary to use a flyback diode (not shown) to protect the semiconductor device; however, the use of duty cycle based control as detailed above can allow in some cases removal of this device.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling the speed of an ABS pump motor comprising the steps of:
    (a) determining a theoretical stop time;
    (b) determining an actual stop time;
    (c) determining that an extended operating time will be required for the pump motor for an ABS braking cycle by comparing the theoretical stop time to the actual stop time and determining that the difference between the actual stop time and the theoretical stop time is greater than an excessive stopping time threshhold; and
    (d) increasing the speed of the pump motor during the ABS braking cycle.

2. The method according to claim 1 wherein the excessive stopping time threshold is predetermined.

3. The method according to claim 1 wherein the excessive stopping time threshold is a function of vehicle speed.

4. The method according to claim 1 wherein the theoretical stop time is determined from a theoretical speed ramp that is based upon a constant vehicle deceleration rate and the actual stop time is determined from an actual speed ramp that is a function of the actual vehicle speed.

5. The method according to claim 4 wherein the actual speed ramp is calculated from at least two actual vehicle speeds.

6. The method according to claim 1 wherein the motor speed is increased in step (d) at a time that occurs after the theoretical stop time.

7. The method according to claim 6 wherein the motor speed is increased after the elapse of a predetermined time delay following the theoretical stopping time.

8. The method according to claim 6 wherein the motor speed is increased after the elapse of a delay following the theoretical stopping time with the time delay being a function of actual vehicle speed.

9. The method according to claim 6 wherein the motor speed is increased after the elapse of a delay following the theoretical stopping time with the time delay being a function of a vehicle operating parameter.

10. The method according to claim 4 including, in step (c), determining a vehicle speed threshold that is a function of the theoretical stopping time and further including, in step (d), increasing the pump motor speed upon the vehicle speed reaching the speed threshold.

11. The method according to claim 9 wherein the vehicle speed threshold is a function of the sum of the theoretical stopping time and a predetermined time delay.

12. The method according to claim 9 wherein the vehicle speed threshold is a function of the sum of the theoretical stopping time and a time delay that is a function of a vehicle operating parameter.

* * * * *